United States Patent
Kawakita et al.

(10) Patent No.: US 10,096,830 B2
(45) Date of Patent: Oct. 9, 2018

(54) POSITIVE ELECTRODE ACTIVE MATERIAL FOR NONAQUEOUS ELECTROLYTE SECONDARY BATTERIES, AND NONAQUEOUS ELECTROLYTE SECONDARY BATTERY

(71) Applicant: Sanyo Electric Co., Ltd., Daito-shi, Osaka (JP)

(72) Inventors: Akihiro Kawakita, Hyogo (JP); Takeshi Ogasawara, Hyogo (JP); Daizo Jito, Osaka (JP)

(73) Assignee: SANYO Electric Co., Ltd., Daito-shi, Osaka (JP)

( * ) Notice: Subject to any disclaimer, the term of this patent is extended or adjusted under 35 U.S.C. 154(b) by 0 days.

(21) Appl. No.: 15/523,183

(22) PCT Filed: Dec. 7, 2015

(86) PCT No.: PCT/JP2015/006057
§ 371 (c)(1),
(2) Date: Apr. 28, 2017

(87) PCT Pub. No.: WO2016/103591
PCT Pub. Date: Jun. 30, 2016

(65) Prior Publication Data
US 2017/0338486 A1 Nov. 23, 2017

(30) Foreign Application Priority Data
Dec. 26, 2014 (JP) .................. 2014-265837

(51) Int. Cl.
| | |
|---|---|
| H01B 1/08 | (2006.01) |
| H01M 4/00 | (2006.01) |
| C01G 53/00 | (2006.01) |
| H01M 4/525 | (2010.01) |
| H01M 10/42 | (2006.01) |

(52) U.S. Cl.
CPC ............ *H01M 4/525* (2013.01); *C01G 53/42* (2013.01); *H01B 1/08* (2013.01);
(Continued)

(58) Field of Classification Search
CPC ..... H01B 1/00; H01B 1/08; H01M 2004/012; H01M 4/00; H01M 4/36; H01M 4/525;
(Continued)

(56) References Cited

U.S. PATENT DOCUMENTS

| | | | | |
|---|---|---|---|---|
| 8,080,335 B2* | 12/2011 | Kawakami | ............ | H01G 9/155 |
| | | | | 252/182.1 |
| 8,722,245 B2* | 5/2014 | Hirose | .................. | H01M 4/134 |
| | | | | 429/218.1 |

(Continued)

FOREIGN PATENT DOCUMENTS

| | | |
|---|---|---|
| JP | 3-321326 A | 12/1996 |
| JP | 2015-15088 A | 1/2015 |

(Continued)

OTHER PUBLICATIONS

International Search Report dated Mar. 1, 2016, issued in counterpart International Application No. PCT/JP2015/006057 (2 pages).

*Primary Examiner* — Mark Kopec
(74) *Attorney, Agent, or Firm* — Westerman, Hattori, Daniels & Adrian, LLP (57) ABSTRACT

A positive electrode active material for a nonaqueous electrolyte secondary battery which includes a secondary particle of a lithium transition metal oxide, the secondary particle being formed by coagulation of primary particles of the lithium transition metal oxide; secondary particles of a rare earth compound, the secondary particles each being formed by coagulation of primary particles of the rare earth compound; and particles of an alkali-metal fluoride. The secondary particles of the rare earth compound are each
(Continued)

deposited on a groove between a pair of adjacent primary particles which is formed in a surface of the secondary particle of the lithium transition metal oxide so as to come into contact with both of the pair of adjacent primary particles in the groove. The particles of the alkali-metal fluoride are deposited on the surface of the secondary particle of the lithium transition metal oxide.

5 Claims, 4 Drawing Sheets

(52) U.S. Cl.
CPC ..... *H01M 10/4235* (2013.01); *C01P 2004/50* (2013.01); *C01P 2004/80* (2013.01); *C01P 2006/40* (2013.01)

(58) Field of Classification Search
CPC ........ C01G 51/00; C01G 51/04; C01G 53/00; C01G 53/04
See application file for complete search history.

(56) References Cited

U.S. PATENT DOCUMENTS

| | | | |
|---|---|---|---|
| 2006/0177739 A1 | 8/2006 | Endo et al. | |
| 2007/0082265 A1* | 4/2007 | Itou | H01M 4/131 429/223 |
| 2009/0081550 A1* | 3/2009 | Inoue | H01M 4/362 429/223 |
| 2015/0221942 A1 | 8/2015 | Sugaya et al. | |
| 2016/0197348 A1* | 7/2016 | Jito | H01M 4/628 429/231.1 |
| 2017/0141384 A1* | 5/2017 | Kawakita | H01M 4/366 |

FOREIGN PATENT DOCUMENTS

| | | |
|---|---|---|
| WO | 2005/008812 A1 | 1/2005 |
| WO | 2014/049958 A1 | 4/2014 |
| WO | 2014/068831 A1 | 5/2014 |
| WO | 2014/156024 A1 | 10/2014 |
| WO | 2015/125444 A1 | 8/2015 |

* cited by examiner

POSITIVE ELECTRODE ACTIVE MATERIAL FOR NONAQUEOUS ELECTROLYTE SECONDARY BATTERIES, AND NONAQUEOUS ELECTROLYTE SECONDARY BATTERY

TECHNICAL FIELD

The present invention relates to the technology for a positive electrode active material for nonaqueous electrolyte secondary batteries and a nonaqueous electrolyte secondary battery.

BACKGROUND ART

There have been demands for a nonaqueous electrolyte secondary battery having high capacities with which the batteries can be used for a prolonged period of time and improved output characteristics with which the batteries are capable of being charged and discharged with a large current in a relatively short period of time.

For example, PTL 1 suggests that depositing an element belonging to Group 3 of the periodic table on the surfaces of base particles of a positive electrode active material may limit the reaction between the positive electrode active material and an electrolyte solution even when the charging voltage is high and this may limit the degradation of the charge-conservation characteristics.

For example, PTL 2 suggests that adding NaF to the inside of a battery case (to a positive electrode, a negative electrode, or an electrolyte solution) may reduce the cycle degradation caused by the reaction between, for example, HF and a positive electrode active material and, as a result, enhance the cycle characteristics (capacity maintenance ratio).

CITATION LIST

Patent Literature

PTL 1: International Publication No. 2005/008812
PTL 2: Japanese Published Unexamined Patent Application No. 8-321326

SUMMARY OF INVENTION

Technical Problem

However, it was found that, even when the techniques disclosed in PTLs 1 and 2 are used, the direct current resistance (hereinafter, abbreviated as "DCR") of a battery may be increased, that is, the output characteristic of the battery may be degraded, after the battery has been subjected to cycles of charging and discharging.

Accordingly, an object of the present invention is to provide a positive electrode active material for a nonaqueous electrolyte secondary battery capable of limiting the increase in the DCR of the battery which occurs after the battery has been subjected to cycles of charging and discharging and a nonaqueous electrolyte secondary battery including the positive electrode active material.

Solution to Problem

A positive electrode active material for a nonaqueous electrolyte secondary battery according to the present invention includes a secondary particle of a lithium transition metal oxide, the secondary particle being formed by coagulation of primary particles of the lithium transition metal oxide; secondary particles of a rare earth compound, the secondary particles each being formed by coagulation of primary particles of the rare earth compound; and particles of an alkali-metal fluoride. The secondary particles of the rare earth compound are each deposited on a groove between a pair of adjacent primary particles of the lithium transition metal oxide, the groove being formed in a surface of the secondary particle of the lithium transition metal oxide, so as to come into contact with both of the pair of adjacent primary particles of the lithium transition metal oxide in the groove. The particles of the alkali-metal fluoride are deposited on the surface of the secondary particle of the lithium transition metal oxide.

Advantageous Effects of Invention

The positive electrode active material according to the present invention may limit the increase in the DCR of the battery which occurs after the battery has been subjected to cycles of charging and discharging.

DESCRIPTION OF EMBODIMENTS

Embodiments of the present invention are described below. The embodiments below are merely exemplary embodiments of the present invention and do not limit the present invention. Various modifications may be made without changing the scope of the present invention. The drawings used as references in the embodiments and Test Examples below are schematics; the dimensions, quantities, and the like of the components illustrated in the drawings may be different from those of the actual components.

Figure 1:
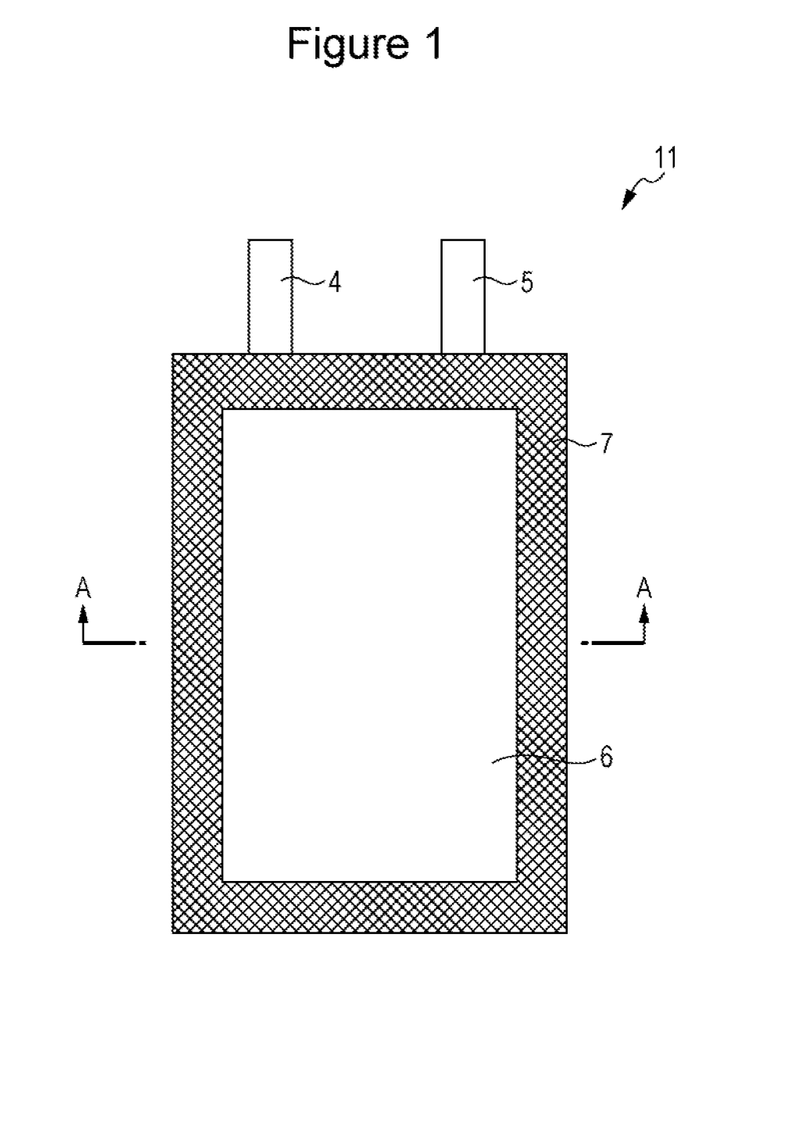
FIG. 1 is a schematic front view of a nonaqueous electrolyte secondary battery according to an exemplary embodiment.
Figure 2:
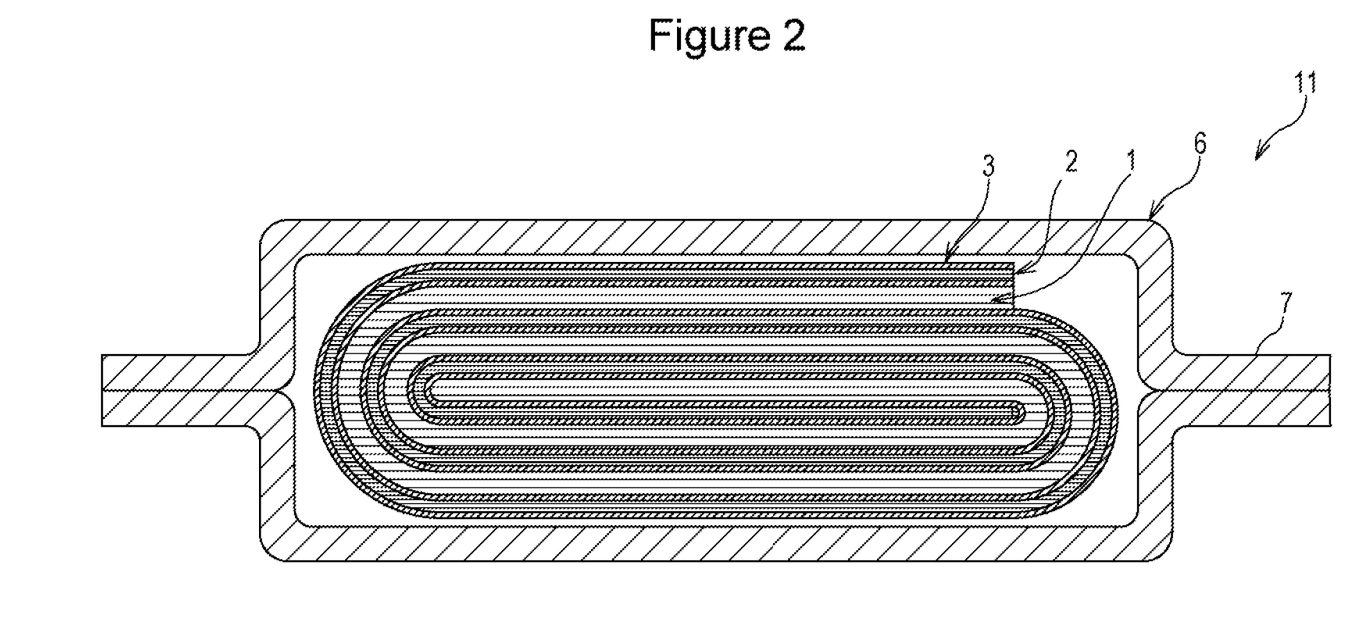
FIG. 2 is a schematic cross-sectional view of the battery illustrated in FIG. 1, taken along Line A-A of FIG. 1.

FIG. 1 is a cross-sectional view of a nonaqueous electrolyte secondary battery according to an exemplary embodiment. FIG. 2 is a schematic cross-sectional view of the battery illustrated in FIG. 1, taken along Line A-A of FIG. 1. As illustrated in FIGS. 1 and 2, a nonaqueous electrolyte secondary battery 11 includes a positive electrode 1, a negative electrode 2, a separator 3 for a nonaqueous electrolyte secondary battery (hereinafter, referred to simply as "separator 3") which is interposed between the positive electrode 1 and the negative electrode 2, and a nonaqueous electrolyte (not shown). The positive electrode 1 and the negative electrode 2, with the separator 3 interposed therebetween, are wound into a spiral form to form a flat electrode group together with the separator 3. The nonaqueous electrolyte secondary battery 11 includes a positive electrode current collector tab 4, a negative electrode current collector tab 5, and an aluminum-laminated case 6 including a closure portion 7, which is formed by joining the peripheries of parts of the aluminum-laminated case to each other by heat sealing. The aluminum-laminated case 6 houses the flat electrode group and the nonaqueous electrolyte. The positive electrode 1 is connected to the positive electrode current collector tab 4. The negative electrode 2 is connected to the negative electrode current collector tab 5. Thus, the structure of a secondary battery that can be charged and discharged is formed.

Although the example illustrated in FIGS. 1 and 2 is a lamination-film-packed battery including the flat electrode group, the type of battery to which the present disclosure can be applied is not limited to this. The shape of the battery may be, for example, cylindrical, rectangular, or coin-like.

The components of the nonaqueous electrolyte secondary battery 11 according to this embodiment are each described below.

<Positive Electrode>

The positive electrode 1 includes a positive electrode current collector that is a metal foil or the like and a positive electrode active material layer disposed on the positive electrode current collector. The positive electrode current collector is, for example, a foil made of a metal that is stable within the range of the potential of the positive electrode, such as aluminum, or a film including a surface layer made of such a metal. The positive electrode active material layer includes a positive electrode active material for a nonaqueous electrolyte secondary battery (hereinafter, referred to simply as "positive electrode active material") and preferably further includes a conductant agent and a binder.

Figure 3:
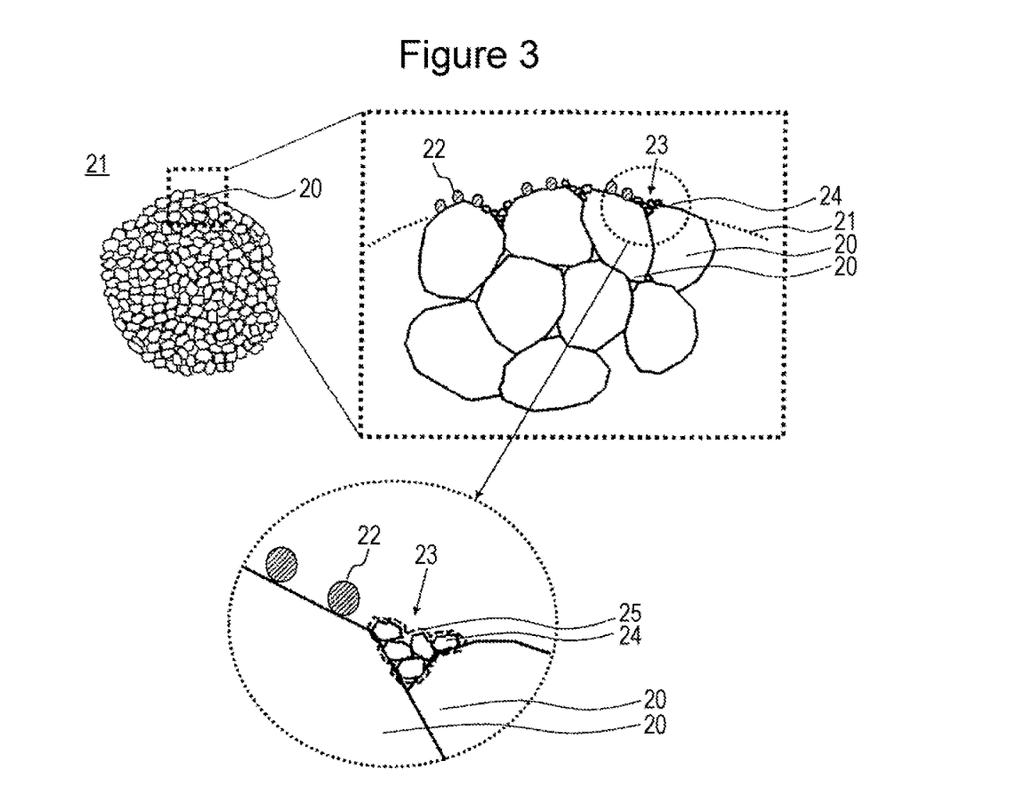
FIG. 3 includes a schematic cross-sectional view of a particle of a positive electrode active material according to an embodiment and magnified schematic cross-sectional views of a part of the particle of the positive electrode active material.

FIG. 3 includes a schematic cross-sectional view of a particle of the positive electrode active material according to the embodiment and magnified schematic cross-sectional views of a part of the particle of the positive electrode active material. As illustrated in FIG. 3, a particle of the positive electrode active material includes a secondary particle 21 of a lithium transition metal oxide which is formed by the coagulation of primary particles 20 of the lithium transition metal oxide, secondary particles 25 of a rare earth compound which are each formed by the coagulation of primary particles 24 of the rare earth compound, and particles 22 of an alkali-metal fluoride. The secondary particles 25 of the rare earth compound are each deposited on a groove 23 between a pair of adjacent primary particles 20 of the lithium transition metal oxide, the groove being formed in the surface of the secondary particle 21 of the lithium transition metal oxide, so as to come into contact with both of the pair of adjacent primary particles 20 in the groove 23. The particles 22 of an alkali-metal fluoride are deposited on the surface of the secondary particle 21 of the lithium transition metal oxide. The particles 22 of an alkali-metal fluoride may be primary particles or secondary particles.

The expression that the secondary particles 25 of the rare earth compound are each deposited so as to come into contact with both of the pair of adjacent primary particles 20 in the groove 23 means that, "in a cross section of the particle of the lithium transition metal oxide", the secondary particles 25 of the rare earth compound each come into contact with both of the surfaces of the pair of adjacent primary particles 20 of the lithium transition metal oxide in the groove 23 between the pair of the primary particles 20 of the lithium transition metal, the groove being formed on the surface of the secondary particle 21 of the lithium transition metal oxide.

In particles of the positive electrode active material according to this embodiment, the secondary particles 25 of the rare earth compound, which are each deposited on the groove 23 so as to come into contact with both of the pair of adjacent primary particles 20 of the lithium transition metal oxide, may reduce the degradation of the surfaces of the pair of adjacent primary particles 20 of the lithium transition metal oxide which occurs during cycles of charging and discharging and the occurrence of cracking at the interface between the pair of the primary particles in the groove 23. It is considered that the secondary particles 25 of the rare earth compound also fix (bond) the pair of adjacent primary particles 20 of the lithium transition metal oxide to each other. This may reduce the occurrence of cracking at the interface between the pair of the primary particles in the groove 23 even when the positive electrode active material is repeatedly expanded and shrunken during cycles of charging and discharging.

Furthermore, the rare-earth compound deposited on the lithium transition metal oxide forms a Li-ion permeable film on the surface of the secondary particle 25 of the lithium transition metal oxide. The film includes an alkali metal and fluorine that originate from the alkali-metal fluoride deposited on the surface of the secondary particle 21 of the lithium transition metal oxide. The Li-ion permeable film limits the decomposition of the nonaqueous electrolyte which occurs during cycles of charging and discharging.

The reductions in the degradation of the surfaces of particles of the positive electrode active material which occurs during cycles of charging and discharging and the occurrence of cracking may result in, for example, a limitation of an increase in the contact resistance between the primary particles 20 of the lithium transition metal oxide. Moreover, the decomposition of the nonaqueous electrolyte may be reduced. This may limit, for example, an increase in the interface resistance between the particles of the positive electrode active material and the nonaqueous electrolyte. As a result, an increase in DCR which occurs during cycles of charging and discharging have been performed may be limited.

The rare earth compound used in this embodiment is preferably at least one compound selected from hydroxides, oxyhydroxides, oxides, carbonates, phosphates, and fluorides of rare earth elements and is particularly preferably at least one compound selected from hydroxides and oxyhydroxides of rare earth elements. Using the above rare earth compounds further reduces, for example, the surface degradation that occurs at the interface between the primary particles.

A rare earth element included in the rare earth compound is at least one element selected from scandium, yttrium, lanthanum, cerium, praseodymium, neodymium, samarium, europium, gadolinium, terbium, dysprosium, holmium, erbium, thulium, ytterbium, and lutetium. Among the above elements, neodymium, samarium, and erbium are particularly preferable. Compounds of neodymium, samarium, or erbium further reduces, for example, the surface degradation that occurs at the interface between the primary particles compared with other rare earth compounds.

Specific examples of the rare earth compound include hydroxides and oxyhydroxides, such as neodymium hydroxide, neodymium oxyhydroxide, samarium hydroxide, samarium oxyhydroxide, erbium hydroxide, and erbium oxyhydroxide; phosphates and carbonates, such as neodymium phosphate, samarium phosphate, erbium phosphate, neodymium carbonate, samarium carbonate, and erbium carbonate; and oxides and fluorides, such as neodymium oxide, samarium oxide, erbium oxide, neodymium fluoride, samarium fluoride, and erbium fluoride.

The average diameter of primary particles of the rare earth compound is preferably 5 nm or more and 100 nm or less and is more preferably 5 nm or more and 80 nm or less. The average diameter of secondary particles of the rare earth compound is preferably 100 nm or more and 400 nm or less and is more preferably 150 nm or more and 300 nm or less. If the average particle diameter exceeds 400 nm, the diameters of secondary particles of the rare earth compound are excessively large. This may reduce the number of grooves of the lithium transition metal oxide on which the secondary particles of the rare earth compound are deposited. In such a case, a large number of grooves of the lithium transition metal oxide fail to be protected by secondary particles of the rare earth compound, and it may become impossible to limit a reduction in the percentage at which the capacity is maintained after high-temperature cycles. If the average particle diameter is less than 100 nm, the area of portions at which each of the secondary particles of the rare earth compound comes into contact with both of a pair of adjacent primary particles of the lithium transition metal oxide is reduced. Accordingly, the capability to fix (bond) the pair of adjacent primary particles of the lithium transition metal oxide to each other is degraded. This may limit the reduction in the occurrence of cracking at the interface between the primary particles of the lithium transition metal oxide on the surface of the secondary particles of the lithium transition metal oxide.

The ratio of the amount of the rare earth compound (the amount of the rare earth compound deposited) to the total mass of the lithium transition metal oxide is preferably 0.005% by mass or more and 0.5% by mass or less and is more preferably 0.05% by mass or more and 0.3% by mass or less in terms of the amount of rare earth element. If the above ratio is less than 0.005% by mass, the amount of rare earth compound deposited on the grooves between the primary particles of the lithium transition metal oxide is small, and the above-described advantageous effect of the rare earth compound may be degraded. If the above ratio exceeds 0.5% by mass, not only the portions between the primary particles of the lithium transition metal oxide but also the surfaces of the secondary particles of the lithium transition metal oxide may be excessively covered with the rare earth compound. This may degrade the initial charge-discharge characteristics.

The alkali-metal fluoride is not limited and may be any compound including an alkali metal, such as lithium, sodium, potassium, rubidium, or cesium, and fluorine. The alkali-metal fluoride is preferably lithium fluoride, sodium fluoride, potassium fluoride, or the like in consideration of, for example, the production costs and adhesion to secondary particles of the lithium transition metal oxide.

The ratio of the amount of alkali-metal fluoride to the total mass of the lithium transition metal oxide is preferably 0.005% by mass or more and 1.0% by mass or less and is more preferably 0.01% by mass or more and 0.5% by mass or less in terms of the amount of fluorine. If the proportion of the alkali-metal fluoride is less than 0.005% by mass in terms of the amount of fluorine, the decomposition of the nonaqueous electrolyte may fail to be limited to a sufficient degree. If the proportion of the alkali-metal fluoride exceeds 1.0% by mass, the specific capacity may be reduced.

The average particle diameter of the alkali-metal fluoride is preferably 1 nm or more and 500 nm or less and is more preferably 2 nm or more and 100 nm or less. If the average particle diameter is less than 1 nm, it may become difficult to control the surface treatment. If the average particle diameter exceeds 500 nm, the particles of the alkali-metal fluoride may fail to be deposited uniformly on the surface of the positive electrode active material and, as a result, the advantageous effects of fluorine may fail to be achieved at some portions of the surface of the positive electrode active material.

The average diameter of primary particles of the lithium transition metal oxide is preferably 100 nm or more and 5 µm or less and is more preferably 300 nm or more and 2 µm or less. If the average particle diameter is less than 100 nm, the amount of the interfaces between the primary particles, which includes the amount of the interfaces that are present inside the secondary particle, is excessively large. This may increase the likelihood of the primary particles cracking when the positive electrode active material is expanded and shrunken during cycles of charging and discharging. If the average particle diameter exceeds 5 µm, the amount of the interfaces between the primary particles, which includes the amount of the interfaces that are present inside the secondary particle, is excessively small. This may reduce the output particularly at low temperatures. The average diameter of secondary particles of the lithium transition metal oxide is preferably 2 µm or more and 40 µm or less and is more preferably 4 µm or more and 20 µm or less. If the average particle diameter is less than 2 µm, the sizes of the secondary particles are excessively small. Accordingly, the packing density of the positive electrode active material may be reduced, and it may become impossible to increase the capacity to a sufficient degree. If the average particle diameter exceeds 40 µm, a sufficiently high output may fail to be achieved particularly at low temperatures. Secondary particles of the lithium transition metal oxide, which are each formed by the binding (coagulation) of primary particles of the lithium transition metal oxide, are always larger than the primary particles.

The average diameters of the above particles are each determined by observing the surface and cross section of an active material particle with a scanning electron microscope (SEM) and measuring, for example, the diameters of several tens of particles. The average diameter of primary particles of the rare earth compound and the average diameter of the particles of the alkali-metal fluoride are measured in a direction along the surface of the active material but not in the thickness direction.

The ratio of the amount of Ni included in the lithium transition metal oxide to the total amount of metal elements included in the lithium transition metal oxide which are other than lithium is preferably 80% or more in order to increase the capacity of the positive electrode and the occurrence of a proton-exchange reaction at the interfaces between the primary particles of the lithium transition metal oxide, which is described below. That is, the proportion of the amount of nickel included in the lithium transition metal oxide is preferably 80% or more with the total number of moles of metals included in the lithium transition metal oxide which are other than Li being 1. Specific examples of the lithium transition metal oxide include lithium-containing nickel manganese composite oxide, lithium-containing nickel cobalt manganese composite oxide, lithium-containing nickel cobalt composite oxide, and lithium-containing nickel cobalt aluminum composite oxide. The molar ratio between nickel, cobalt, and aluminum included in the lithium-containing nickel cobalt aluminum composite oxide may be, for example, 8:1:1, 82:15:3, 85:12:3, 87:10:3, 88:9:3, 88:10:2, 89:8:3, 90:7:3, 91:6:3, 91:7:2, 92:5:3, or 94:3:3. The above lithium transition metal oxides may be used alone or in a mixture.

In a lithium transition metal oxide having a Ni ratio (Ni proportion) of 80% or more, the proportion of trivalent Ni is large. This increases the occurrence of a proton-exchange reaction between water and lithium included in the lithium transition metal oxide in water. LiOH produced by the proton-exchange reaction migrates from the inside of each interface between primary particles of the lithium transition metal oxide to the surface of the secondary particle. This makes the alkali (OH$^-$) concentration in a gap between a pair of adjacent primary particles of the lithium transition metal oxide on the surface of the secondary particle of the lithium transition metal oxide to be higher than the alkali concentration in the vicinities of the gap. This increases the likelihood of primary particles of the rare earth compound being deposited on the groove between the primary particles while being coagulated with one another to form secondary particles by being attracted by the alkali present in the groove. In contrast, in a lithium transition metal composite oxide having a Ni ratio of less than 80%, the proportion of trivalent Ni is small and the above proton-exchange reaction is not likely to occur. Thus, the alkali concentration in a gap between each pair of adjacent primary particles of the lithium transition metal oxide does not differ from the alkali concentration in the vicinity of the gap. Consequently, when secondary particles of the rare earth compound formed by the binding of the precipitated primary particles of the rare earth compound adhere to the surface of the lithium transition metal oxide, they are likely to adhere to protrusions of primary particles of the lithium transition metal oxide, to which the secondary particles of the rare earth compound are more likely to come into collision.

In particular, the ratio of the amount of cobalt included in the lithium transition metal oxide to the total number of moles of metal elements included in the lithium transition metal oxide which are other than lithium is preferably 7 mol % or less and is more preferably 5 mol % or less in order to, for example, increase the capacity of the battery. If the amount of cobalt is excessively small, the structure is likely to change during charging and discharging and, as a result, the occurrence of cracking at the interfaces between particles may be increased. Accordingly, when a lithium transition metal oxide including 7 mol % or less of cobalt is used, it is preferable to dissolve tungsten in the lithium transition metal composite oxide before the rare earth compound and the alkali-metal fluoride are deposited on the lithium transition metal composite oxide as illustrated in FIG. 1. This reduces the degradation of the surfaces of primary particles of the lithium transition metal oxide and cracking in the surfaces of the primary particles both from the surfaces of the particles and the inside of the particles and, as a result, further limits a reduction in the percentage at which the capacity is maintained after high-temperature cycles.

The lithium transition metal oxide may further include other additional elements. Examples of the additional elements include boron (B), magnesium (Mg), aluminum (Al), titanium (Ti), chromium (Cr), iron (Fe), copper (Cu), zinc (Zn), niobium (Nb), molybdenum (Mo), tantalum (Ta), tungsten (W), zirconium (Zr), tin (Sn), sodium (Na), potassium (K), barium (Ba), strontium (Sr), calcium (Ca), bismuth (Bi), and germanium (Ge).

It is preferable to remove alkali components deposited on the surface of the lithium transition metal oxide by washing the lithium transition metal oxide with water or the like in order to, for example, produce a battery having a high-temperature storage property.

One of methods for depositing the rare earth compound on the surfaces of secondary particles of the lithium transition metal oxide is to add an aqueous solution including the rare earth compound dissolved therein to a suspension including the lithium transition metal oxide.

In order to deposit the rare earth compound on the surfaces of secondary particles of the lithium transition metal oxide, it is desirable to adjust the pH of the suspension to 11.5 or more and preferably 12 or more while the aqueous solution, in which the compound containing a rare earth element is dissolved, is added to the suspension. This is because performing the treatment under the above condition increases the likelihood of particles of the rare earth compound being locally deposited on the surfaces of the secondary particles of the lithium transition metal oxide. In contrast, if the pH of the suspension is set to 6 or more and 10 or less, particles of the rare earth compound are likely to be deposited uniformly over the entire surfaces of secondary particles of the lithium transition metal oxide. This may result in failure to sufficiently reduce the occurrence of cracking in the active material which may be caused due to the surface degradation at the interfaces of primary particles of the lithium transition metal oxide on the surfaces of the secondary particles of the lithium transition metal oxide. If the pH is less than 6, at least part of the lithium transition metal oxide may be dissolved.

It is desirable to adjust the pH of the suspension to be 14 or less or preferably 13 or less. If the pH exceeds 14, the size of primary particles of the rare earth compound becomes excessively large. In addition, an excessive amount of alkali remains inside the particles of the lithium transition metal oxide. This may increase the occurrence of gelation in the preparation of the slurry and cause an excessive amount of gas to be generated while the battery is stored.

When the aqueous solution including the rare earth compound dissolved therein is added to the suspension including the lithium transition metal oxide, a hydroxide of the rare earth element is precipitated in the case where the aqueous solution is directly used. In another case where a sufficient amount of carbon dioxide has been dissolved, a carbonate of the rare earth element is precipitated. In the case where a sufficient amount of phosphate ions have been added to the suspension, the rare earth compound is precipitated on the surfaces of particles of the lithium transition metal oxide in the form of a phosphate of the rare earth element.

The particles of the lithium transition metal oxide on which the rare earth compound is precipitated are preferably subjected to a heat treatment. The heat treatment is preferably performed at 80° C. or more and 500° C. or less and particularly preferably at 80° C. or more and 400° C. or less. If the heat-treatment temperature is less than 80° C., an excessively large amount of time may be required for sufficiently drying the positive electrode active material by the heat treatment. If the heat-treatment temperature exceeds 500° C., a portion of the rare earth compound deposited on the surfaces of the particles of the lithium transition metal oxide may diffuse inside the particles. As a result, the occurrence of surface degradation at the interfaces between the primary particles of the lithium transition metal oxide may fail to be sufficiently reduced. In contrast, when the heat-treatment temperature is 400° C. or less, the rare earth element hardly diffuses inside the particles of the lithium transition metal composite oxide and strongly adheres to the interfaces between the primary particles. This enhances, for example, a reduction in the occurrence of surface degradation at the interfaces between the primary particles of the lithium transition metal oxide and the capability to bond the primary particles to one another. In the case where a hydroxide of the rare earth element is deposited at the interfaces between the primary particles, most of the hydroxide is changed into an oxyhydroxide at about 200° C. to about 300° C. Most of the oxyhydroxide is further changed into an oxide at about 450° C. to about 500° C. Accordingly, when the heat treatment is performed at 400° C. or less, it is possible to dispose a hydroxide or an oxyhydroxide of the rare earth element, which is capable of markedly reducing the occurrence of the surface degradation, selectively at the interfaces between the primary particles of the lithium transition metal oxide. This further limits an increase in DCR which occurs during cycles of charging and discharging have been performed.

The heat treatment of the lithium transition metal oxide on which the rare earth compound is deposited is preferably performed in vacuum. If the heat treatment is not performed in vacuum, the moisture contained in the suspension used for the deposition of the rare earth compound, which is permeated inside particles of the lithium transition metal oxide, may fail to be efficiently removed because the secondary particles of the rare earth compound deposited on the grooves between the primary particles which are formed on the surfaces of secondary particles of the lithium transition metal oxide make it difficult to remove the moisture from the inside of the particles when the particles are dried. In such a case, the amount of moisture that migrates from the positive electrode active material into the battery is increased, and a substance produced by the reaction between the moisture and the nonaqueous electrolyte may degrade the surface of the active material.

The aqueous solution including the rare earth compound may be prepared by dissolving an acetic acid salt, a nitric acid salt, a sulfuric acid salt, an oxide, a chloride, or the like in water or an organic solvent. An aqueous solution prepared by dissolving the above compound in water is preferably used because, for example, it has high solubility. In particular, when an oxide of a rare earth element is used, the aqueous solution may be prepared by dissolving the rare earth element in an acid such as sulfuric acid, hydrochloric acid, nitric acid, or acetic acid and dissolving the resulting sulfuric acid salt, chloride, or nitric acid salt of the rare earth element in water.

If the rare earth compound is deposited on the surfaces of secondary particles of the lithium transition metal oxide by a method in which the lithium transition metal oxide and the rare earth compound are mixed with each other by a dry process, particles of the rare earth compound adhere onto the surfaces of the secondary particles of the lithium transition metal oxide at random and it is difficult to deposit the rare earth compound selectively at the interfaces between the primary particles which are present on the surfaces of the secondary particles. In addition, if the dry-mixing method is employed, it is difficult to firmly deposit the rare earth compound on the lithium transition metal oxide. As a result, it may become impossible to sufficiently fix (bond) the primary particles to one another. Furthermore, the rare earth compound may become easily detached from the lithium transition metal oxide when the active material is mixed with the conductant agent, the binder, and the like to form a positive electrode mixture.

For depositing the alkali-metal fluoride on the surfaces of the secondary particles of the lithium transition metal oxide, for example, an aqueous solution including the alkali-metal fluoride dissolved therein may be added to a suspension including the lithium transition metal oxide. The aqueous solution including the alkali-metal fluoride may alternatively be added (sprayed) to particles of the lithium transition metal oxide while being mixed. In the case where an aqueous solution including the alkali-metal fluoride dissolved therein is added to a suspension including the lithium transition metal oxide, it is desirable to add the aqueous solution including the alkali-metal fluoride to the suspension together with an aqueous solution including the above-described rare earth compound dissolved therein. In the case where an aqueous solution including the alkali-metal fluoride dissolved therein is added (sprayed) to particles of the lithium transition metal oxide while being mixed, it is desirable to add (spray) the aqueous solution including the alkali-metal fluoride to the particles of the lithium transition metal oxide while being mixed after the rare earth compound has been deposited to the particles of the lithium transition metal oxide by adding an aqueous solution including the rare earth compound dissolved therein to the suspension including the lithium transition metal oxide.

The positive electrode active material is not limited to that including only the particles of the lithium transition metal oxide according to the above-described embodiment; it is also possible to use the lithium transition metal oxide according to the above-described embodiment in combination with another positive electrode active material. The other positive electrode active material is not limited and may be any compound to which lithium ions can be inserted and from which lithium ions can be removed reversibly. Examples of such compound include compounds having a layered structure, such as lithium cobaltite and lithium nickel cobalt manganese oxide; compounds having a spinel structure, such as lithium manganese oxide and lithium nickel manganese oxide; and compounds having an olivine structure, to which lithium ions can be inserted and from which lithium ions can be removed while the stable crystal structure is maintained. In the case where only one type of positive electrode active material is used or different types of positive electrode active materials are used, the diameters of the particles of the positive electrode active material may be identical or different from one another.

The conductant agent is used for, for example, increasing the electric conductivity of the positive electrode active material layer. Examples of the conductant agent include carbon materials such as carbon black, acetylene black, Ketjenblack, and graphite. The above conductant agents may be used alone or in combination of two or more.

The binder is used for, for example, maintaining the positive electrode active material and the conductant agent to be in intimate contact with each other and enhancing the capabilities of the positive electrode active material and the like to bind onto the surface of the positive electrode current collector. Examples of the binder include fluoropolymers and rubber polymers. Examples of the fluoropolymers include polytetrafluoroethylene (PTFE), polyvinylidene fluoride (PVdF), and modified products thereof. Examples of the rubber polymers include an ethylene-propylene-isoprene copolymer and an ethylene-propylene-butadiene copolymer. The above binders may be used alone or in combination of two or more. The binder may be used in combination with a thickener, such as carboxymethyl cellulose (CMC) or polyethylene oxide (PEO).

<Negative Electrode>

The negative electrode 2 includes a negative electrode current collector made of a metal foil or the like and a negative electrode active material layer disposed on the negative electrode current collector. The negative electrode current collector is, for example, a foil made of a metal that is stable within the range of the potential of the negative electrode, such as copper, or a film including a surface layer made of a metal that is stable within the range of the potential of the negative electrode, such as copper. The negative electrode active material layer includes a negative electrode active material capable of occluding and releasing lithium ions and preferably includes a binder. The binder may be PTFE or the like as in the case of the positive electrode and is preferably, for example, a styrene-butadiene copolymer (SBR) or the modified product thereof. The binder may be used in combination with a thickener such as CMC.

Examples of the negative electrode active material include carbon materials capable of occluding and releasing lithium, metals that can be alloyed with lithium, and alloy compounds that include such a metal. Examples of the carbon materials include graphites such as natural graphite, nongraphitizable carbon, and synthetic graphite; and cokes. Examples of the alloy compounds include compounds including at least one metal that can be alloyed with lithium. In particular, the element that can be alloyed with lithium is preferably silicon or tin. Silicon oxide, tin oxide, and the like, which are produced by the reaction of the above elements with oxygen, may also be used. The above carbon materials may be mixed with a compound including silicon or tin. Although they reduces the energy density, compounds having a higher charging-discharging potential with reference to metal lithium than carbon materials or the like, such as lithium titanate, may be used as a negative electrode material.

<Separator>

The separator 3 may be a porous sheet having ion permeability and an insulating property. Specific examples of the porous sheet include a microporous thin film, woven fabric, and nonwoven fabric. The separator is preferably composed of a polyolefin such as polyethylene or polypropylene.

<Nonaqueous Electrolyte>

The nonaqueous electrolyte includes a nonaqueous solvent and an electrolyte salt dissolved in the nonaqueous solvent. Examples of the electrolyte salt included in the nonaqueous electrolyte include $LiClO_4$, $LiBF_4$, $LiPF_6$, $LiAlCl_4$, $LiSbF_6$, LiSCN, $LiN(FSO_2)_2$, $LiN(CF_3SO_2)_2$, $LiN(C_2F_5SO_2)_2$, $LiN(CF_3SO_2)(C_4F_9SO_2)$, $LiCF_3SO_3$, $LiCF_3CO_2$, $LiAsF_6$, $LiB_{10}Cl_{10}$, lithium lower-aliphatic carboxylate, LiCl, LiBr, LiI, lithium chloroborane, borates, and imides. A lithium salt other than a fluorine-containing lithium salt [lithium salt containing one or more elements selected from P, B, O, S, N, and Cl (e.g., $LiPO_2F_2$)] may be added to the fluorine-containing lithium salt. Among the above electrolyte salts, $LiPF_6$ is preferably used in consideration of ionic conductivity and electrochemical stability. The above electrolyte salts may be used alone or in combination of two or more. The amount of electrolyte salt included in 1 L of the nonaqueous electrolyte is preferably 0.8 to 1.5 mol. Alternatively, a lithium salt including an oxalate complex serving as an anion may also be used. Examples of such a lithium salt include LiBOB [lithium-bisoxalateborate], $Li[B(C_2O_4)F_2]$, $Li[P(C_2O_4)F_4]$, and $Li[P(C_2O_4)_2F_2]$. Among the above lithium salts, LiBOB, which enables a stable film to be formed on the negative electrode, is particularly preferably used.

Examples of the nonaqueous solvent include cyclic carbonic acid esters, chain carbonic acid esters, and cyclic carboxylic acid esters. Examples of the cyclic carbonic acid esters include propylene carbonate (PC), ethylene carbonate (EC), fluoroethylene carbonate (FEC), and vinylene carbonate (VC). Examples of the chain carbonic acid esters include diethyl carbonate (DEC), ethyl methyl carbonate (EMC), and dimethyl carbonate (DMC). Examples of the cyclic carboxylic acid esters include γ-butyrolactone (GBL) and γ-valerolactone (GVL). Examples of chain carboxylic acid esters include methyl propionate (MP) and fluoromethyl propionate (FMP). The above nonaqueous solvents may be used alone or in combination of two or more. In particular, a mixed solvent including a cyclic carbonate and a chain carbonate, which has a high dielectric constant, a low viscosity, and a low melting temperature, is preferably used as a nonaqueous solvent having a high lithium-ion conductivity. The volume ratio between the cyclic carbonate and the chain carbonate included in the mixed solvent is preferably set to 2:8 to 5:5. The above solvent may be used in combination with, for example, the following compounds: compounds including an ester, such as methyl acetate, ethyl acetate, propyl acetate, methyl propionate, ethyl propionate, and γ-butyrolactone; compounds including a sulfone group, such as propane sultone; compounds including an ether, such as 1,2-dimethoxyethane, 1,2-diethoxyethane, tetrahydrofuran, 1,3-dioxane, 1,4-dioxane, and 2-methyltetrahydrofuran; compounds including a nitrile, such as butyronitrile, valeronitrile, n-heptanenitrile, succinonitrile, glutaronitrile, adiponitrile, pimelonitrile, 1,2,3-propanetricarbonitrile, and 1,3,5-pentanetricarbonitrile; and compounds including an amide, such as dimethylformamide. Some of the hydrogen (H) atoms of the above solvents may be replaced with fluorine (F) atoms.

A layer including an inorganic filler may optionally be interposed between the positive electrode 1 and the separator 3 or between the negative electrode 2 and the separator 3. Examples of the filler include oxides and phosphates that contain one or more elements selected from titanium, aluminum, silicon, and magnesium. The surfaces of the above inorganic fillers may be treated with a hydroxide or the like.

EXAMPLES

The present invention is further described below with reference to Examples. The present invention is not limited by Examples below.

Example 1

[Preparation of Positive Electrode]

LiOH and an oxide prepared by heating nickel cobalt aluminum composite hydroxide represented by $Ni_{0.91}Co_{0.06}Al_{0.03}(OH)_Z$, which was formed by coprecipitation, at 500° C. were mixed together using an Ishikawa automated mortar such that the molar ratio between Li and all transition metals ($Ni_{0.91}Co_{0.06}Al_{0.03}$) was 1.05:1.0. The resulting mixture was subjected to a heat treatment at 760° C. for 20 hours in an oxygen atmosphere and subsequently pulverized. Thus, particles of a lithium nickel cobalt aluminum composite oxide represented by $Li_{1.05}Ni_{0.91}Co_{0.06}Al_{0.03}O_2$ were prepared. The average diameter of secondary particles of the lithium transition metal oxide was about 15 μm.

To 1.5 L of pure water, 1000 g of particles of the lithium nickel cobalt aluminum composite oxide, which served as a lithium transition metal oxide, were added. The resulting mixture was stirred to form a suspension including the lithium transition metal oxide dispersed in pure water. To the suspension, a 0.1-mol/L aqueous erbium sulfate solution, which was prepared by dissolving erbium oxide in sulfuric acid, was added incrementally in small amounts. While the aqueous erbium sulfate solution was added to the suspension, the pH of the suspension was 11.5 to 12.0. Subsequently, the suspension was filtered. An aqueous solution containing 0.6 mol/L of sodium fluoride prepared by dissolving sodium fluoride in pure water was sprayed to the resulting powder,
which was subsequently dried in vacuum at 200° C. Thus, a positive electrode active material was prepared.

An observation of the surface of the positive electrode active material with an SEM confirmed that secondary particles of erbium hydroxide having an average diameter of 100 to 200 nm, which were formed by the coagulation of primary particles of erbium hydroxide having an average diameter of 20 to 30 nm, were deposited on the surfaces of secondary particles of the lithium transition metal oxide. It was also confirmed that most of the secondary particles of erbium hydroxide were each deposited on a groove between a pair of adjacent primary particles of the lithium transition metal oxide which was formed in the surfaces of secondary particles of the lithium transition metal oxide so as to come into contact with both of the pair of adjacent primary particles in the groove. It was also confirmed that particles of sodium fluoride having an average diameter of 10 to 30 nm were deposited on the surfaces (grooves and protrusions) of secondary particles of the lithium transition metal oxide.

It is considered that, in Example 1, where the pH of the suspension was high (11.5 to 12.0), primary particles of erbium hydroxide precipitated in the suspension were joined to (coagulated with) one another to form secondary particles. Furthermore, in Example 1, where the proportion of Ni was high (91%) and the proportion of trivalent Ni was large, a proton-exchange reaction between $LiNiO_2$ and $H_2O$ was likely to occur at the interfaces between primary particles of the lithium transition metal oxide, and a large amount of LiOH generated by the proton-exchange reaction migrated from the inside of the secondary particles of the lithium transition metal oxide at the interfaces between adjacent primary particles of the lithium transition metal oxide. This increased the alkali concentration in a gap between each pair of adjacent primary particles which was formed in the surface of the lithium transition metal oxide. As a result, the particles of erbium hydroxide were precipitated in the suspension while being coagulated with one another at the grooves formed in the interfaces between the primary particles to form secondary particles by being attracted by the alkali.

The amount of erbium compound deposited on the lithium transition metal oxide which was measured by inductively coupled plasma (ICP)-atomic emission spectroscopy was 0.15% by mass of the amount of lithium nickel cobalt aluminum composite oxide in terms of the amount of erbium. The amount of alkali-metal fluoride deposited on the lithium transition metal oxide which was measured by ion chromatography was 0.10% by mass of the amount of lithium nickel cobalt aluminum composite oxide in terms of the amount of fluorine.

The particles of the positive electrode active material, carbon black used as a conductant agent, and an N-methyl-2-pyrrolidone solution of polyvinylidene fluoride used as a binder were weighed such that the mass ratio between the particles of the positive electrode active material, the conductant agent, and the binder was 100:1:1. The above materials were mixed together while being kneaded with a T.K. HIVIS MIX (produced by PRIMIX Corporation) to form a positive electrode mixture slurry.

The positive electrode mixture slurry was applied onto both surfaces of a positive electrode current collector that was an aluminum foil. After the resulting coating film had been dried, rolling was performed with a reduction roller. A current collector tab made of aluminum was attached to the resulting current collector. Thus, a positive electrode plate including a positive electrode current collector and two positive electrode mixture layers disposed on the respective surfaces of the current collector was prepared. The packing density of the positive electrode active material in the positive electrode was 3.60 $g/cm^3$.

[Preparation of Negative Electrode]

Synthetic graphite, which served as a negative electrode active material, was mixed with CMC (sodium carboxymethyl cellulose) used as a dispersant and a SBR (styrene-butadiene rubber) used as a binder in an aqueous solution such that the mass ratio between the negative electrode active material, the dispersant, and the binder was 100:1:1 in order to prepare a negative electrode mixture slurry. The negative electrode mixture slurry was uniformly applied onto both surfaces of a negative electrode current collector that was a copper foil. After the resulting coating film had been dried, rolling was performed with a reduction roller. A current collector tab made of nickel was attached to the resulting current collector. Thus, a negative electrode plate including a negative electrode current collector and two negative electrode mixture layers disposed on the respective surfaces of the current collector was prepared. The packing density of the negative electrode active material in the negative electrode was 1.50 $g/cm^3$.

[Preparation of Nonaqueous Electrolyte]

Lithium hexafluorophosphate ($LiPF_6$) was dissolved in a mixed solvent including ethylene carbonate (EC), methyl ethyl carbonate (MEC), and dimethyl carbonate (DMC) at a volume ratio of 2:2:6 such that the concentration of $LiPF_6$ in the mixed solvent was 1.3 mol/L. Vinylene carbonate (VC) was dissolved in the mixed solvent such that the concentration of VC in the mixed solvent was 2.0% by mass. Thus, a nonaqueous electrolyte solution was prepared.

[Test Cell]

The positive electrode and the negative electrode were stacked on each other with a separator interposed between the electrodes. After the resulting multilayer body had been wound into a spiral form, the core used for winding the multilayer body was removed. Thus, a spiral electrode body was prepared. The spiral electrode body was pressed to form a flat electrode body. The flat electrode body and the nonaqueous electrolyte solution were charged into a case laminated with aluminum. Thus a battery was prepared. The size of the battery was 3.6 mm thick, 35 mm wide, and 62 mm long. The discharging capacity of the nonaqueous electrolyte secondary battery which was measured by charging the battery to 4.20 V and subsequently discharging the battery to 3.0 V was 950 mAh.

Example 2

A battery was prepared as in Example 1, except that an aqueous solution containing 0.14 mol/L of sodium fluoride which was prepared by dissolving sodium fluoride in pure water was sprayed to the lithium transition metal oxide in the preparation of the positive electrode active material. The amount of erbium compound deposited on the lithium transition metal oxide was 0.15% by mass of the amount of lithium nickel cobalt aluminum composite oxide in terms of the amount of erbium. The amount of alkali-metal fluoride deposited on the lithium transition metal oxide was 0.10% by mass of the amount of lithium nickel cobalt aluminum composite oxide in terms of the amount of fluorine.

Comparative Example 1

A battery was prepared as in Test Example 1, except that the aqueous solution prepared by dissolving sodium fluoride in pure water was not sprayed to the lithium transition metal oxide in the preparation of the positive electrode active material. The amount of erbium compound deposited on the lithium transition metal oxide was 0.15% by mass of the amount of lithium nickel cobalt aluminum composite oxide in terms of the amount of erbium.

Comparative Example 2

A battery was prepared as in Example 2, except that the pH of the suspension was consistently maintained to be 9 while the aqueous erbium sulfate solution was added to the suspension. For adjusting (maintaining) the pH of the suspension to be 9, a 10-mass % aqueous sodium hydroxide solution was used as needed.

An observation of the surface of the positive electrode active material with a SEM confirmed that primary particles of erbium hydroxide having an average diameter of 10 to 50 nm were deposited on the surfaces of secondary particles of the lithium transition metal oxide so as to uniformly disperse over the entire surfaces (protrusions and grooves) of the secondary particles of the lithium transition metal oxide without forming secondary particles. It was also confirmed that particles of alkali-metal fluoride having an average diameter of 10 to 30 nm were deposited on the surfaces (grooves and protrusions) of secondary particles of the lithium transition metal oxide.

It is considered that, in Comparative Example 2, where the pH of the suspension was 9, the rate at which particles of erbium hydroxide were precipitated in the suspension was low. This caused the particles of erbium hydroxide to uniformly precipitate over the entire surfaces of the secondary particles of the lithium transition metal oxide without forming secondary particles.

The amount of erbium compound deposited on the lithium transition metal oxide was 0.15% by mass of the amount of lithium nickel cobalt aluminum composite oxide in terms of the amount of erbium. The amount of alkali-metal fluoride deposited on the lithium transition metal oxide was 0.10% by mass of the amount of lithium nickel cobalt aluminum composite oxide in terms of the amount of fluorine.

Comparative Example 3

A battery was prepared as in Comparative Example 2, except that the aqueous solution prepared by dissolving sodium fluoride in pure water was not sprayed to the lithium transition metal oxide in the preparation of the positive electrode active material. The amount of erbium compound deposited on the lithium transition metal oxide was 0.15% by mass of the amount of lithium nickel cobalt aluminum composite oxide in terms of the amount of erbium.

Comparative Example 4

A battery was prepared as in Comparative Example 2, except that, as a result of omitting the addition of the aqueous erbium sulfate solution in the preparation of the positive electrode active material, erbium hydroxide was not deposited onto the surfaces of secondary particles of the lithium transition metal oxide. The amount of alkali-metal fluoride deposited on the lithium transition metal oxide was 0.10% by mass of the amount of lithium nickel cobalt aluminum composite oxide in terms of the amount of fluorine.

Comparative Example 5

A battery was prepared as in Example 1, except that, in the preparation of the positive electrode active material, the addition of the aqueous erbium sulfate solution was omitted and the aqueous solution prepared by dissolving sodium fluoride in pure water was not sprayed to the lithium transition metal oxide.

<Measurement of DCR>

The batteries prepared in Examples 1 and 2 and Comparative Examples 1 to 5 were subjected to 100 cycles of charging and discharging. Subsequently, the DCR of each of the batteries after the 100 cycles was measured under the following conditions. The term "cycle of charging and discharging" used herein refers to charging and discharging performed under the following conditions.

(Charge-Discharge Cycle Test)

Charging Conditions

The battery was charged at a constant current of 475 mA until the voltage of the battery reached 4.2 V (potential of positive electrode with reference to lithium: 4.3 V). After the voltage of the battery had reached 4.2 V, the battery was charged at a constant voltage of 4.2 V until the current reached 30 mA.

Discharging Conditions

The battery was discharged at a constant current of 950 mA until the voltage of the battery reached 3.0 V.

Interval Conditions

The interval between each charging and corresponding discharging was set to 10 minutes.

(Measurement of DCR after 100 Cycles)

The battery that had been subjected to the 100 cycles was charged at 475 mA until the SOC reached 100% and subsequently charged at a constant voltage equal to the voltage of the battery at which the SOC reached 100% until the current reached 30 mA. The OCV of the battery was measured after an interval of 120 minutes since the charging of the battery had finished. Subsequently, the battery was discharged at 475 mA for 10 seconds. The voltage of the battery was measured subsequent to the 10-second discharging. The DCR (SOC: 100%) of the battery that had been subjected to the 100 cycles was determined using Formula (1) below.

$$\text{DCR }(\Omega) = (\text{OCV after 120-minute interval (V)} - \text{voltage after 10-second discharging (V)})/(\text{current after 10-second discharging (A)}) \quad (1)$$

Table 1 shows the DCRs of the batteries prepared in Examples 1 and 2 and Comparative Examples 1 to 5 which had been subjected to the 100 cycles.

TABLE 1

| | Rare earth element | State of rare earth compound deposited | Amount of alkali-metal fluoride (mass %) | DCR after 100 cycles (mΩ) |
|---|---|---|---|---|
| Example 1 | Er | Coagulated in grooves | 0.21 | 403 |
| Example 2 | Er | Coagulated in grooves | 0.05 | 415 |
| Comparative example 1 | Er | Coagulated in grooves | 0 | 470 |

TABLE 1-continued

| | Rare earth element | State of rare earth compound deposited | Amount of alkali-metal fluoride (mass %) | DCR after 100 cycles (mΩ) |
|---|---|---|---|---|
| Comparative example 2 | Er | Uniformly dispersed | 0.05 | 535 |
| Comparative example 3 | Er | Uniformly dispersed | 0 | 570 |
| Comparative example 4 | None | — | 0.05 | 571 |
| Comparative example 5 | None | — | 0 | 571 |

In the positive electrode active materials included in the batteries prepared in Examples 1 and 2, the secondary particles 25 of the rare earth compound were each deposited on both of a pair of adjacent primary particles 20 of the lithium transition metal oxide in the groove 23 as illustrated in FIG. 3. This reduced the occurrence of degradation of the surfaces of the pair of adjacent primary particles 20 of the lithium transition metal oxide and the occurrence of cracking at the interface between the primary particles 20 during the cycles of charging and discharging. The secondary particles 25 of the rare earth compound each enabled the pair of adjacent primary particles 20 of the lithium transition metal oxide to be fixed (bonded) to each other and reduced the occurrence of cracking at the interface between the primary particles in the groove 23.

In the positive electrode active materials included in the batteries prepared in Examples 1 and 2, furthermore, the rare earth compound deposited on the surfaces of the secondary particles 21 of the lithium transition metal oxide formed a good-quality film over the entire surfaces of the secondary particles 21 of the lithium transition metal oxide. The film included an alkali metal and fluorine that originated from the alkali-metal fluoride. This Li-ion permeable film limited the decomposition of the electrolyte solution which occurred during the cycles of charging and discharging.

As described above, in the batteries prepared in Examples 1 and 2, the degradation of the surfaces of the particles of the positive electrode active material, cracking in the surfaces of the particles of the positive electrode active material, and the decomposition of the electrolyte solution were reduced. This presumably limited increases in the contact resistance between the particles and the resistance at the interface between the particles and the electrolyte solution and, as a result, an increase in DCR which occurred during the cycles of charging and discharging compared with the batteries prepared in Comparative Examples 1 to 5.

In the positive electrode active material included in the battery prepared in Comparative Example 1, the secondary particles of the rare earth compound were each deposited on both of a pair of adjacent primary particles of the lithium transition metal oxide in the groove. This reduced the occurrence of degradation of the surfaces of the pair of adjacent primary particles of the lithium transition metal oxide and the occurrence of cracking in the surfaces of the adjacent primary particles during the cycles of charging and discharging as in the battery prepared in Example 1. However, the alkali-metal fluoride was not deposited on the surfaces of the particles of the positive electrode active material included in the battery prepared in Comparative Example 1. Accordingly, the good-quality film deposited over the entire surfaces of the secondary particles of the lithium transition metal oxide did not include the alkali metal and fluorine that originated from the alkali-metal fluoride. This resulted in failure to limit the decomposition of the electrolyte solution which occurred during the cycles of charging and discharging compared with the batteries prepared in Examples 1 and 2.

As described above, in the battery prepared in Comparative Example 1, while the occurrence of degradation of the surfaces of particles of the positive electrode active material and the occurrence of cracking in the surfaces of the particles were reduced, it was not possible to limit the decomposition of the electrolyte solution which occurred during the cycles of charging and discharging. This presumably increased, for example, the resistance at the interface between the particles and the electrolyte solution and, as a result, the DCR of the battery that had been subjected to the cycles of charging and discharging compared with the batteries prepared in Examples 1 and 2.

Figure 4:
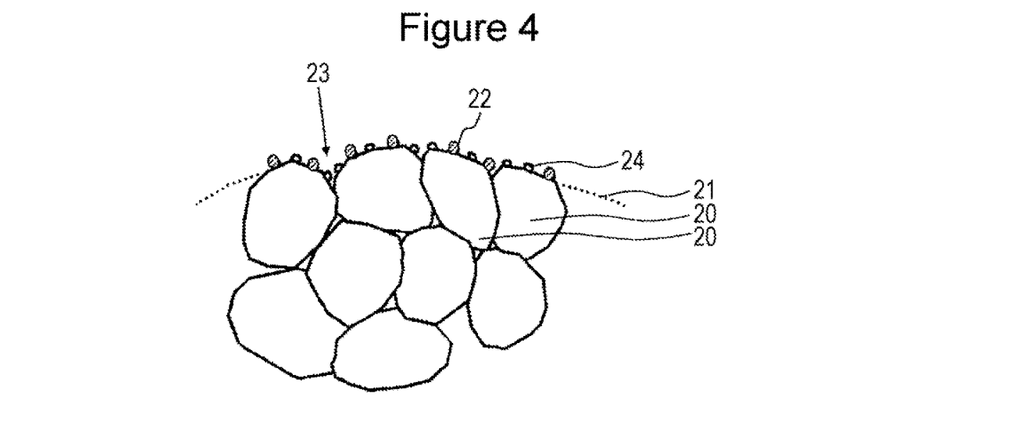
FIG. 4 is a schematic cross-sectional view of a part of a particle of a positive electrode active material prepared in Comparative Example 2.

FIG. 4 is a schematic cross-sectional view of a part of a particle of the positive electrode active material prepared in Comparative Example 2. In the positive electrode active material included in the battery prepared in Comparative Example 2, the primary particles 24 of the rare earth compound were deposited uniformly over the entire surface of the secondary particle 21 of the lithium transition metal oxide without forming secondary particles as illustrated in FIG. 4. In other words, in the battery prepared in Comparative Example 2, the secondary particles of the rare earth compound were not deposited in the groove 23 formed in the surface of the secondary particle 21 of the lithium transition metal oxide. This resulted in failure to reduce the occurrence of degradation of the surfaces of particles of the positive electrode active material and the occurrence of cracking in the surfaces of the particles compared with the positive electrode active materials included in the batteries prepared in Examples 1 and 2. In the positive electrode active material included in the battery prepared in Comparative Example 2, the primary particles 24 of the rare earth compound and the particles 22 of the alkali-metal fluoride that were present on the surface of the secondary particle 21 of the lithium transition metal oxide formed a good-quality film including the alkali metal and fluorine that originated from the alkali-metal fluoride over the entire surface of the secondary particle 21 of the lithium transition metal oxide. This limited the decomposition of the electrolyte solution which occurred during the cycles of charging and discharging.

As described above, in the battery prepared in Comparative Example 2, while the decomposition of the electrolyte solution which occurred during the cycles of charging and discharging was limited, it was not possible to reduce the occurrence of degradation of the surfaces of particles of the positive electrode active material and the occurrence of cracking in the surfaces of the particles. This presumably increased, for example, the contact resistance between the particles and, as a result, the DCR of the battery that had been subjected to the cycles of charging and discharging compared with the batteries prepared in Examples 1 and 2.

In the positive electrode active material included in the battery prepared in Comparative Example 3, the primary particles of the rare earth compound were deposited uniformly over the entire surface of the secondary particle of the lithium transition metal oxide without forming secondary particles as in the positive electrode active material used in Comparative Example 2. In addition, the alkali-metal fluoride was not deposited on the surface of the lithium transition metal oxide. Accordingly, in the battery prepared in Comparative Example 3, it was not possible to reduce the occurrence of degradation of the surfaces of particles of the positive electrode active material and the occurrence of cracking in the surfaces of the particles. It was also not possible to limit the decomposition of the electrolyte solution which occurred during the cycles of charging and discharging. This presumably increased, for example, the contact resistance between the particles, the resistance at the interface between the particles and the electrolyte solution, and, as a result, the DCR of the battery that had been subjected to the cycles of charging and discharging compared with the batteries prepared in Comparative Examples 1 and 2.

The DCRs of the batteries prepared in Examples 1 and 2 and Comparative Example 1, which included a positive electrode active material in which the secondary particles of the rare earth compound were deposited on both of a pair of adjacent primary particles of the lithium transition metal oxide in the groove (hereinafter, this positive electrode active material is referred to as "positive electrode active material in which coagulated particles of the rare earth compound were deposited on the groove of the secondary particle of the lithium transition metal oxide", which had been subjected to the 100 cycles were lower, by 100 mΩ or more, than those of the batteries prepared in Comparative Examples 2 and 3, which included a positive electrode active material in which the primary particles of the rare earth compound were deposited uniformly over the entire surface of the secondary particle of the lithium transition metal oxide without forming secondary particles (a comparison between the batteries prepared in Examples 1 and 2 and the battery prepared in Comparative Example 2, and a comparison between the battery prepared in Comparative Example 1 and the battery prepared in Comparative Example 3). On the other hand, a comparison between the batteries prepared in Examples 1 and 2 and Comparative Example 2, which included a lithium transition metal oxide on which the alkali-metal fluoride was deposited, and the batteries prepared in Comparative Examples 1 and 3, which included a lithium transition metal oxide on which the alkali-metal fluoride was not deposited, confirmed that the DCRs of the batteries prepared in Examples 1 and 2 which had been subjected to the 100 cycles were lower, by 55 mΩ or more, than the DCR of the battery prepared in Comparative Example 1 and that the DCR of the battery prepared in Comparative Example 2 which had been subjected to the 100 cycles were lower than that of the battery prepared in Comparative Example 3 by about 35 mΩ. This confirms that reducing occurrence of degradation of the surfaces of particles of the positive electrode active material and the occurrence of cracking in the surfaces of the particles more effectively limited the increase in DCR which occurred during the cycles of charging and discharging than limiting the decomposition of the electrolyte solution which occurred during the cycles of charging and discharging. This is presumably because of the following reasons.

If the degradation of the surfaces of particles of the positive electrode active material and cracking in the surfaces of the particles occur, new surfaces that are not covered with the good-quality film are disadvantageously created on the surfaces of the particles of the positive electrode active material. This presumably degrades the capability of the film including the alkali metal and fluorine that originated from the alkali-metal fluoride to limit the decomposition of the electrolyte solution. It is considered that, for the above reasons, the difference in DCR after the cycles of charging and discharging between, for example, the battery prepared in Comparative Example 1 and the battery prepared in Comparative Example 3 (100 mΩ) was larger than the difference in DCR after the cycles of charging and discharging between, for example, the battery prepared in Example 2 and the battery prepared in Comparative Example 1 (55 mΩ) as described above.

In the positive electrode active material included in the battery prepared in Comparative Example 4, the rare earth compound was not deposited on the secondary particle of the lithium transition metal oxide. Thus, it was not possible to reduce the occurrence of degradation of the surfaces of particles of the positive electrode active material and the occurrence of cracking in the surfaces of the particles. In the positive electrode active material included in the battery prepared in Comparative Example 4, the alkali-metal fluoride was deposited on the surface of the lithium transition metal oxide, but the rare earth compound was not deposited on the surface of the lithium transition metal oxide. Thus, the good-quality film was not formed over the entire surface of the secondary particle. This resulted in failure to limit the decomposition of the electrolyte solution which occurred during the cycles of charging and discharging.

As described above, in the battery prepared in Comparative Example 4, it was not possible to limit the decomposition of the electrolyte solution which occurred during the cycles of charging and discharging. It was also not possible to reduce the occurrence of degradation of the surfaces of particles of the positive electrode active material and the occurrence of cracking in the surfaces of the particles. This presumably increased, for example, the contact resistance between the particles, the resistance at the interface between the particles and the electrolyte solution, and, as a result, the DCR of the battery that had been subjected to the cycles of charging and discharging compared with the batteries prepared in Examples 1 and 2.

In the positive electrode active material included in the battery prepared in Comparative Example 5, the rare earth compound and the alkali-metal fluoride were not deposited on the surface of the lithium transition metal oxide. Thus, it was not possible to reduce the occurrence of degradation of the surfaces of particles of the positive electrode active material and the occurrence of cracking in the surfaces of the particles and limit the decomposition of the electrolyte solution which occurred during cycles of charging and discharging. In the battery prepared in Comparative Example 5, this presumably increased, for example, the contact resistance between the particles and the resistance at the interface between the particles and the electrolyte solution. As a result, the DCR of the battery that had been subjected to the cycles of charging and discharging was increased compared with the batteries prepared in Examples 1 and 2.

Reference Example

LiOH and an oxide prepared by heating nickel cobalt manganese composite hydroxide represented by $Ni_{0.35}Co_{0.35}Mn_{0.30}(OH)_2$, which was formed by coprecipitation, at 500° C. were mixed together using an Ishikawa automated mortar such that the molar ratio between Li and all transition metals ($Ni_{0.35}Co_{0.35}Mn_{0.30}$) was 1.05:1. The resulting mixture was subjected to a heat treatment at 1000° C. for 20 hours in an air atmosphere and subsequently pulverized. Thus, a lithium nickel cobalt manganese composite oxide represented by $Li_{1.05}Ni_{0.35}Co_{0.35}Mn_{0.30}O_2$ was prepared. The average diameter of secondary particles of the lithium transition metal oxide was about 15 μm.

To 1.5 L of pure water, 1000 g of particles of the lithium nickel cobalt manganese composite oxide were added. The resulting mixture was stirred to form a suspension including the lithium nickel cobalt manganese composite oxide dispersed in pure water. To the suspension, a 0.1-mol/L aqueous erbium sulfate solution, which was prepared by dissolving erbium oxide in sulfuric acid, was added incrementally in small amounts. While the aqueous erbium sulfate solution was added to the suspension, the pH of the suspension was 11.5 to 12.0. Subsequently, the suspension was filtered. The resulting powder was dried in vacuum at 200° C. Thus, a positive electrode active material in which particles of an erbium compound were deposited on the surfaces of secondary particles of the lithium transition metal oxide was prepared.

An observation of the surface of the positive electrode active material with an SEM confirmed that secondary particles of erbium hydroxide having an average diameter of 100 to 200 nm, which were formed by the coagulation of primary particles of erbium hydroxide having an average diameter of 20 to 30 nm, were deposited on the surfaces of secondary particles of the lithium transition metal oxide.

Figure 5:
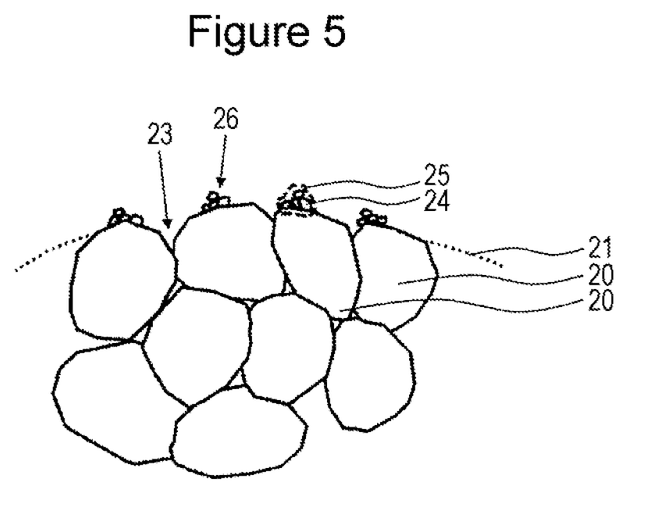
FIG. 5 is a schematic cross-sectional view of a part of a particle of a positive electrode active material prepared in Reference Example.

FIG. 5 is a schematic cross-sectional view of a part of a particle of the positive electrode active material prepared in Reference Example. As illustrated in FIG. 5, in the positive electrode active material prepared in Reference Example, secondary particles 25 of the rare earth compound, which were each formed by coagulation of the primary particles 24 of the rare earth compound, were deposited on protrusions 26 of the surface of the secondary particle 21 of the lithium transition metal oxide and grooves 23 between the primary particles 20 of the lithium transition metal oxide. It was also confirmed that the secondary particles 25 of the rare earth compound were each deposited on the groove 23 so as to come into contact with only one of a pair of adjacent primary particles 20 of the lithium transition metal oxide. The amount of erbium compound deposited on the lithium transition metal oxide which was measured by inductively coupled plasma (ICP)-atomic emission spectroscopy was 0.15% by mass of the amount of lithium nickel cobalt manganese composite oxide in terms of the amount of erbium.

It is considered that, in Reference Example, where the proportion of Ni was low (35%) and the proportion of trivalent Ni was small, a reaction in which LiOH generated by the proton-exchange reaction migrates toward the surface of the secondary particle 21 of the lithium transition metal oxide through the interfaces between the primary particles 20 of the lithium transition metal oxide hardly occurred. Consequently, in Reference Example, where the pH of the suspension was high (11.5 to 12.0), although the primary particles of the erbium hydroxide which were precipitated in the suspension were joined to (coagulated with) one another to form secondary particles, most of the secondary particles of the erbium hydroxide were deposited on the surface of the lithium transition metal oxide so as to come into contact with the protrusions 26 formed in the surface of the secondary particle 21 of the lithium transition metal oxide, to which the secondary particles of the erbium hydroxide were more likely to come into collision. While some of the secondary particles of the erbium hydroxide may adhere to the groove 23, in such a case, the secondary particles of the erbium hydroxide each adhere to only one of a pair of adjacent primary particles 20 of the lithium transition metal oxide in the groove 23.

Example 3

A battery was prepared as in Example 2, except that a samarium sulfate solution was used instead of the aqueous erbium sulfate solution in the preparation of the positive electrode active material. The amount of samarium compound deposited on the lithium transition metal oxide was 0.13% by mass of the amount of lithium nickel cobalt aluminum composite oxide in terms of the amount of samarium.

Example 4

A battery was prepared as in Example 2, except that a neodymium sulfate solution was used instead of the aqueous erbium sulfate solution in the preparation of the positive electrode active material. The amount of neodymium compound deposited on the lithium transition metal oxide was 0.13% by mass of the amount of lithium nickel cobalt aluminum composite oxide in terms of the amount of neodymium.

The DCRs of the batteries prepared in Examples 3 and 4 were determined after the batteries had been subjected to the 100 cycles as in Example 1. Table 2 shows the DCRs of the batteries prepared in Examples 2 to 4 that had been subjected to the 100 cycles.

TABLE 2

| | Rare earth element | State of rare earth compound deposited | Amount of alkali-metal fluoride (mass %) | DCR after 100 cycles (mΩ) |
|---|---|---|---|---|
| Example 2 | Er | Coagulated in grooves | 0.05 | 415 |
| Example 3 | Sm | Coagulated in grooves | 0.05 | 420 |
| Example 4 | Nd | Coagulated in grooves | 0.05 | 422 |

The results shown in Table 2 confirm that the DCR after the 100 cycles were low even in the cases where samarium or neodymium, which is also a rare earth element similarly to erbium, was used. Thus, it is considered that using a rare earth element other than erbium, samarium, or neodymium may also limit an increase in resistance which occurs during the cycles.

REFERENCE SIGNS LIST

1 POSITIVE ELECTRODE, 2 NEGATIVE ELECTRODE, 3 SEPARATOR FOR A NONAQUEOUS ELECTROLYTE SECONDARY BATTERY, 4 POSITIVE ELECTRODE CURRENT COLLECTOR TAB, 5 NEGATIVE ELECTRODE CURRENT COLLECTOR TAB, 6 ALUMINUM-LAMINATED CASE, 7 CLOSURE PORTION, 11 NONAQUEOUS ELECTROLYTE SECONDARY BATTERY, 20,24 PRIMARY PARTICLES, 21,25 SECONDARY PARTICLES, 22 PARTICLES, 23 GROOVE, 26 PROTRUSION.

The invention claimed is:
1. A positive electrode active material for a nonaqueous electrolyte secondary battery, the positive electrode active material comprising a secondary particle of a lithium transition metal oxide, the secondary particle being formed by coagulation of primary particles of the lithium transition metal oxide; secondary particles of a rare earth compound, the secondary particles each being formed by coagulation of primary particles of the rare earth compound; and particles of an alkali-metal fluoride,
the secondary particles of the rare earth compound each being deposited on a groove between a pair of adjacent primary particles of the lithium transition metal oxide, the groove being formed in a surface of the secondary particle of the lithium transition metal oxide, so as to come into contact with both of the pair of adjacent primary particles of the lithium transition metal oxide in the groove, the particles of the alkali-metal fluoride being deposited on the surface of the secondary particle of the lithium transition metal oxide.

2. The positive electrode active material for a nonaqueous electrolyte secondary battery according to claim 1, wherein a rare earth element included in the rare earth compound is at least one element selected from neodymium, samarium, and erbium.

3. The positive electrode active material for a nonaqueous electrolyte secondary battery according to claim 1, wherein the rare earth compound is at least one compound selected from hydroxides and oxyhydroxides.

4. The positive electrode active material for a nonaqueous electrolyte secondary battery according to claim 1, wherein the ratio of the amount of nickel included in the lithium transition metal oxide to the total number of moles of metal elements included in the lithium transition metal oxide which are other than lithium is 80 mol % or more.

5. A nonaqueous electrolyte secondary battery comprising a positive electrode including the positive electrode active material for a nonaqueous electrolyte secondary battery according to claim 1.

\* \* \* \* \*